United States Patent Office 3,524,875
Patented Aug. 18, 1970

3,524,875
PURIFICATION OF ACRYLONITRILE
David James Hadley, Epsom Downs, Anthony Richard Philpotts, Carshalton Beeches, and Alfred Frank Millidge, Coulsdon, England, assignors to BP Chemicals (U.K.) Limited, London, England, a British company
No Drawing. Continuation of application Ser. No. 628,837, Apr. 6, 1967. This application July 25, 1969, Ser. No. 848,398
Int. Cl. C07c *121/32*
U.S. Cl. 260—465.3                                                                      9 Claims

ABSTRACT OF THE DISCLOSURE

A process for the production of acrylonitrile monomer of improved quality by removal from the monomer of oxazole $C_3H_3NO$.

---

This is a continuation of application Ser. No. 628,837, filed Apr. 6, 1967, now abandoned.

The present invention relates to the purification of acrylonitrile.

The manufacture of acrylonitrile by the catalytic vapour phase reaction of propylene or acrolein with ammonia and molecular oxygen at an elevated temperature, is well known. It has been observed that some acrylonitrile, prepared by such a process, when polymerised to give polyacrylonitrile, produces a discoloured product. This product is not therefor suitable for such applications as fibre production wherein it is desired to employ completely colourless polymer. It has now been discovered that production of discoloured polyacrylonitrile is caused by the presence of small amounts of a hitherto unexpected impurity, and that removal of this impurity from the acrylonitrile monomer will considerably improve the colour of the polyacrylonitrile.

According to the invention a process for improving the quality of acrylonitrile monomer prepared by reaction of propylene or acrolein with oxygen and ammonia comprises removing oxazole (1)

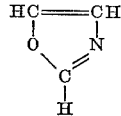

(1)

from the monomer.

It is preferred to romove from the monomer any oxazole in excess of 10 and preferably in excess of 5 parts per million of the acrylonitrile.

The oxazole can be removed from the acrylonitrile for instance by fractional distillation to remove an oxazole-enriched fraction overhead. The separation by fractional distillation may be carried out in the absence of water or in the presence of water as a hydroextractive distillation.

It has now been found according to the present invention in carrying out such a hydroextractive distillation it is preferred to employ a volume ratio of water to organic feed of at least 4.5 to 1 since this has been found to be particularly advantageous in obtaining substantially complete removal of the oxazole as a base product from the distillation, substantially pure acrylonitrile being removed as an overhead distillate. The volume ratio of water to organic feed is preferably in the range 4.5 to 7.0:1 and is especially about 5:1.

The oxazole enriched fraction may be further treated e.g. by refractionation or extraction to remove oxazole.

The oxazole may also be removed from the monomer by extraction with e.g. water or acids, e.g. dilute sulphuric acid.

The process of the present invention is illustrated with the following example:

EXAMPLE

Crude acrylonitrile containing approximately 200 p.p.m. oxazole and 3.0% acetonitrile was extractively distilled in a 1 inch diameter glass Oldershaw column of 55 trays using distilled water as solvent.

With a water:organic feed ratio of 5:1 no acetonitrile and only 5 p.p.m. oxazole was present in the distillate. When the feed ratio was dropped to 2.5:1, the majority of these impurities passed overhead, demonstrating clearly the advantage of working at a feed ratio of 5:1.

| Water feed/organic feed: | P.p.m. oxazole in distillate |
|---|---|
| 3.8 | 200 |
| 4.0 | 200 |
| 5.0 | 5 |
| 5.3 | 5 |
| 7.3 | 5 |

What is claimed is:

1. A process for preparing acrylonitrile by the vapor phase catalytic reaction of propylene or acrolein with oxygen and ammonia, the improvement which comprises reducing the quantity of oxazole present in the acrylonitrile obtained from said reaction from a quantity of up to about 200 parts per million to a level not in excess of 10 parts per million.

2. A process as defined in claim 1 in which the quantity of oxazole of said acrylonitrile is reduced to a level not in excess of 5 parts per million.

3. A process as defined in claim 1 in which the oxazole is removed by extraction in water or acid.

4. A process as defined in claim 1 wherein the oxazole is removed by fractional distillation.

5. A process as defined in claim 1 wherein the oxazole is reduced by hydroextractive distillation.

6. A process as defined in claim 5 wherein the hydroextractive distillation is carried out employing a volume ratio of water to organic feed of at least 4.5:1.

7. A process as defined in claim 6 wherein the volume ratio of water to organic feed is in the range of 4.5 to 7.0:1.

8. A process as defined in claim 7 wherein the volume ratio of water to organic feed is about 5:1.

9. A process as defined in claim 4 wherein the acrylonitrile obtained from said reaction is first distilled to remove the oxazole-enriched fraction overhead and subsequently removing oxazole from the overhead fraction by refractionation or extraction.

References Cited

UNITED STATES PATENTS

| | | | |
|---|---|---|---|
| 3,009,943 | 11/1961 | Hadley et al. | 260—465.3 |
| 3,073,753 | 1/1963 | Hadley et al. | 260—465.3 XR |
| 3,142,697 | 7/1964 | Jennings et al. | 260—465.3 |
| 3,210,399 | 10/1965 | Krzemicki | 260—465.3 |
| 3,287,394 | 11/1966 | Young et al. | 260—465.3 |
| 3,293,279 | 12/1966 | Young et al. | 260—465.3 |

JOSEPH PAUL BRUST, Primary Examiner

U.S. Cl. X.R.

260—307, 465.9